United States Patent
Hara et al.

(10) Patent No.: US 10,491,127 B2
(45) Date of Patent: Nov. 26, 2019

(54) POWER SUPPLY CONTROL UNIT AND ISOLATION TYPE SWITCHING POWER SUPPLY DEVICE

(71) Applicant: Rohm Co., Ltd., Kyoto (JP)

(72) Inventors: Hideo Hara, Kyoto (JP); Yohei Akamatsu, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 15/704,256

(22) Filed: Sep. 14, 2017

(65) Prior Publication Data

US 2018/0083543 A1   Mar. 22, 2018

(30) Foreign Application Priority Data

| Sep. 16, 2016 | (JP) | 2016-181320 |
| Sep. 16, 2016 | (JP) | 2016-181322 |
| Sep. 16, 2016 | (JP) | 2016-181323 |
| Sep. 16, 2016 | (JP) | 2016-181325 |
| Dec. 2, 2016  | (JP) | 2016-235245 |

(51) Int. Cl.

| H02M 3/335 | (2006.01) |
| H02M 1/36  | (2007.01) |
| H02M 1/32  | (2007.01) |
| H02M 3/338 | (2006.01) |
| H02M 3/156 | (2006.01) |
| H02M 1/00  | (2006.01) |

(52) U.S. Cl.
CPC ......... *H02M 3/33523* (2013.01); *H02M 1/32* (2013.01); *H02M 1/36* (2013.01); *H02M 3/1563* (2013.01); *H02M 3/335* (2013.01); *H02M 3/3385* (2013.01); *H02M 3/33569* (2013.01); *H02M 2001/0006* (2013.01); *H02M 2001/0009* (2013.01); *H02M 2001/0025* (2013.01); *H02M 2001/0035* (2013.01)

(58) Field of Classification Search
CPC ...................................................... H02M 3/335
See application file for complete search history.

(56) References Cited

U.S. PATENT DOCUMENTS

2010/0188872 A1* 7/2010 Matsumoto ............. H02M 1/34
                                                    363/21.06
2015/0124491 A1   5/2015 Tsou et al.

FOREIGN PATENT DOCUMENTS

| JP | 2012-125084 | 6/2012 |
| TW | 201607228 A | 2/2016 |
| TW | I523395 B    | 2/2016 |

* cited by examiner

*Primary Examiner* — Jue Zhang
*Assistant Examiner* — Trinh Q Dang
(74) *Attorney, Agent, or Firm* — Fish & Richardson P.C.

(57) ABSTRACT

The power supply control unit includes an on trigger signal generating unit arranged to generate an on trigger signal for turning on the switching element on the basis of a feedback signal of flyback voltage, a first timer arranged to measure a predetermined minimum OFF time, a second timer arranged to measure time based on an ON time, a minimum OFF time setting unit arranged to compare the predetermined minimum OFF time measured by the first timer with the time measured by the second timer so as to set a longer time as a minimum OFF time, and an on timing determining unit arranged to determine timing for turning on the switching element on the basis of the set minimum OFF time and the on trigger signal.

37 Claims, 15 Drawing Sheets

POWER SUPPLY CONTROL UNIT AND ISOLATION TYPE SWITCHING POWER SUPPLY DEVICE

CROSS-REFERENCE TO RELATED APPLICATIONS

This nonprovisional application claims priority under 35 U.S.C. § 119(a) on Japanese Patent Applications 2016-181320, 2016-181322, 2016-181323, and 2016-181325 each filed on Sep. 16, 2016, and 2016-235245 filed on Dec. 2, 2016, the entire contents of which are hereby incorporated by reference.

BACKGROUND OF THE INVENTION

Field of the Invention

The present invention relates to a power supply control unit.

Description of Related Art

Conventionally, various types of isolation type flyback switching power supply devices, which convert an input DC voltage into a desired DC voltage, are developed. The isolation type switching power supply device switches and drives a switching element connected in series to a primary winding of a transformer, so that an output voltage is obtained on a secondary side of the transformer. When the switching element is turned on, excitation energy is stored in the transformer. When the switching element is turned off, the excitation energy is discharged through a diode and a smoothing capacitor disposed on the secondary side of the transformer. An example of the isolation type switching power supply device is disclosed in JP-A-2012-125084, for example.

In addition, a linear control method (such as a voltage mode control method or a current mode control method), or a nonlinear control method (such as a fixed ON time method, a fixed OFF time method, or a hysteresis window method) is conventionally used as a method for controlling a switching power supply device.

Some of the isolation type flyback switching power supply devices described above set a predetermined minimum OFF time so as to prevent the OFF time in which the switching element is turned off from being too short, and hence limits the OFF time not to be shorter than the minimum OFF time.

In the case described above, when the output voltage is rapidly decreased in transient response, the OFF time is set to the minimum OFF time and the switching is controlled to increase the output voltage. However, depending on a situation of storing excitation energy in the transformer by turning on the switching element, the excitation energy may not be sufficiently discharged on the secondary side because the OFF time is short. For this reason, there is a problem that a transient response speed is decreased.

In addition, when the OFF time is set to the minimum OFF time, because discharge time of the excitation energy is short, primary side current that flows on the primary side when the switching element is turned on in the next period is increased. For this reason, there is also a problem that a variation amount of an increasing peak value of the primary side current generated in ON time is increased.

In addition, there is also a problem that fluctuation of switching frequency is increased when the OFF time is set to the minimum OFF time.

In view of the above situation, it is a first object to realize faster transient response, to suppress increase of the peak value of the primary side current, and to reduce fluctuation of the switching frequency.

Furthermore, some of the isolation type flyback switching power supply devices described above have a function of detecting overcurrent of the primary side current to perform a protection (OCP). In this isolation type switching power supply device, when it is detected that the primary side current has reached an overcurrent protection level (OCP level), the switching element is forcibly turned off, and afterward when the minimum OFF time passes, the switching element is turned on again in the control.

Although generated secondary side current is decreased while the switching element is turned off, because the switching element is turned off only for a short time as the minimum OFF time in the control described above, the secondary side current is not so much decreased. As a result, the primary side current that starts to flow in the next ON time soon reaches the overcurrent protection level when the primary side current increases, and the switching element is turned off again. Therefore, there is a problem that charging on the primary side by turning on the switching element becomes insufficient, and hence the increase in the output voltage of the isolation type switching power supply device becomes slow.

In view of the above situation, it is a second object to enable acceleration of output voltage increase in the overcurrent protection.

Further in the isolation type switching power supply described above, a feedback signal of a flyback voltage (i.e. a voltage obtained by converting a sum voltage of the output voltage and a forward voltage of a secondary side diode into a voltage on the primary side using turns ratio of the transformer) is output when the switching element is in OFF state and is used for control. In this case, after the output of the feedback signal is started, the output is maintained at a timing a little before the minimum OFF time.

Here, a portion of the flyback voltage corresponding to the forward voltage of the secondary side diode is an error portion, which becomes smaller as time passes while the secondary side current is decreased and the forward voltage is decreased. However, because the timing a little before the minimum OFF time is early timing, accuracy of the feedback signal may be insufficient at the timing.

In view of the above situation, it is a third object to enable use of the feedback signal of the flyback voltage in good accuracy for the control.

Furthermore, in the isolation type switching power supply described above, the voltage applied to the switching element when the switching element is turned off may cause ringing due to leakage inductance of the transformer. In order to prevent breakdown of the switching element that may occur when the ringing exceeds withstand voltage of the switching element, a Snubber circuit is disposed to suppress the ringing in many cases.

However, the Snubber circuit is difficult to design for a user. If the design is failed, the switching element may be broken.

In view of the above situation, it is a fourth object to enable suppression of ringing generated in the voltage applied to the switching element when the switching element is turned off, without using a Snubber circuit.

SUMMARY OF THE INVENTION

A power supply control unit according to one aspect of the present invention is a power supply control unit used for an isolation type flyback switching power supply device including a transformer having a primary winding and a secondary winding, and a switching element, one terminal of the primary winding being connected to an application terminal of an input voltage, while the other terminal of the primary winding being connected to the switching element. The power supply control unit includes:

an on trigger signal generating unit arranged to generate an on trigger signal for turning on the switching element on the basis of a feedback signal of flyback voltage;

a first timer arranged to measure a predetermined minimum OFF time;

a second timer arranged to measure time based on ON time;

a minimum OFF time setting unit arranged to compare the predetermined minimum OFF time measured by the first timer with the time measured by the second timer so as to set a longer time as a minimum OFF time; and an on timing determining unit arranged to determine timing for turning on the switching element on the basis of the set minimum OFF time and the on trigger signal.

A power supply control unit according to another aspect of the present invention is a power supply control unit used for an isolation type flyback switching power supply device including a transformer having a primary winding and a secondary winding, and a switching element, one terminal of the primary winding being connected to an application terminal of an input voltage, while the other terminal of the primary winding being connected to the switching element. The power supply control unit includes:

an ON time setting unit arranged to set an ON time on the basis of switching duty of the switching element;

an on trigger signal generating unit arranged to generate an on trigger signal for turning on the switching element on the basis of a feedback signal of flyback voltage;

a first timer arranged to measure a predetermined minimum OFF time;

a second timer arranged to measure time based on the ON time set by the ON time setting unit;

a minimum OFF time setting unit arranged to compare the predetermined minimum OFF time measured by the first timer with the time measured by the second timer so as to set a longer time as a minimum OFF time; and an on timing determining unit arranged to determine timing for turning on the switching element on the basis of the set minimum OFF time and the on trigger signal.

A power supply control unit according to still another aspect of the present invention is a power supply control unit used for an isolation type flyback switching power supply device including a transformer having a primary winding and a secondary winding, and a switching element, one terminal of the primary winding being connected to an application terminal of an input voltage, while the other terminal of the primary winding being connected to the switching element. The power supply control unit includes:

an OCP unit (overcurrent protection unit) arranged to detect overcurrent of primary side current;

an off control unit arranged to turn off the switching element when the overcurrent is detected;

a first timer arranged to measure a predetermined minimum OFF time at timing delayed from turning off by the off control unit;

an on trigger signal generating unit arranged to generate an on trigger signal for turning on the switching element on the basis of a feedback signal of flyback voltage; and an on timing determining unit arranged to determine timing for turning on the switching element on the basis of the measured minimum OFF time and the on trigger signal.

A power supply control unit according to still another aspect of the present invention is a power supply control unit used for an isolation type flyback switching power supply device including a transformer having a primary winding and a secondary winding, and a switching element, one terminal of the primary winding being connected to an application terminal of an input voltage, while the other terminal of the primary winding being connected to the switching element. The power supply control unit includes:

a feedback signal output unit arranged to generate and output a feedback signal of flyback voltage;

an on trigger signal generating unit arranged to generate an on trigger signal for turning on the switching element on the basis of output of the feedback signal output unit;

a first timer arranged to measure a predetermined minimum OFF time;

a second timer arranged to measure time that is a first predetermined ratio of the ON time;

a minimum OFF time setting unit arranged to compare the predetermined minimum OFF time measured by the first timer with the time measured by the second timer so as to set a longer time as a minimum OFF time;

an on timing determining unit arranged to determine timing for turning on the switching element on the basis of the set minimum OFF time and the on trigger signal; and a timing control unit arranged to control output timing of the feedback signal output unit.

After the switching element is turned off, the timing control unit compares time that is a second predetermined ratio of the predetermined minimum OFF time with time that is a third predetermined ratio of the first predetermined ratio of the ON time, so as to control to output the feedback signal until timing when a longer time elapses, and to hold the output at the timing.

A power supply control unit according to still another aspect of the present invention includes:

a transformer including a primary winding having one terminal to which an application terminal of the input voltage is connected and a secondary winding;

a main switching element having a current input terminal connected to the other terminal of the primary winding;

a sub-switching element having a current input terminal connected to the current input terminal of the main switching element; and a voltage applying unit arranged to apply voltage to a control terminal of the sub-switching element so as to sequentially switch among state where the main switching element and the sub-switching element are both turned on, state where the main switching element is turned off while the sub-switching element is turned on, and state where the main switching element and the sub-switching element are both turned off.

A power supply control unit according to still another aspect of the present invention is a power supply control unit used for an isolation type switching power supply device including a transformer having a primary winding whose one terminal is connected to an application terminal of an input voltage and a secondary winding. The power supply control unit includes:

a main switching element having a current input terminal connected to the other terminal of the primary winding;

a sub-switching element having a current input terminal connected to the current input terminal of the main switching element; and a voltage applying unit arranged to apply voltage to a control terminal of the sub-switching element so as to turn off the sub-switching element after the main switching element is turned off.

DETAILED DESCRIPTION OF THE PREFERRED EMBODIMENTS

<Overall Structure of Isolation Type Switching Power Supply Device>

Figure 1:
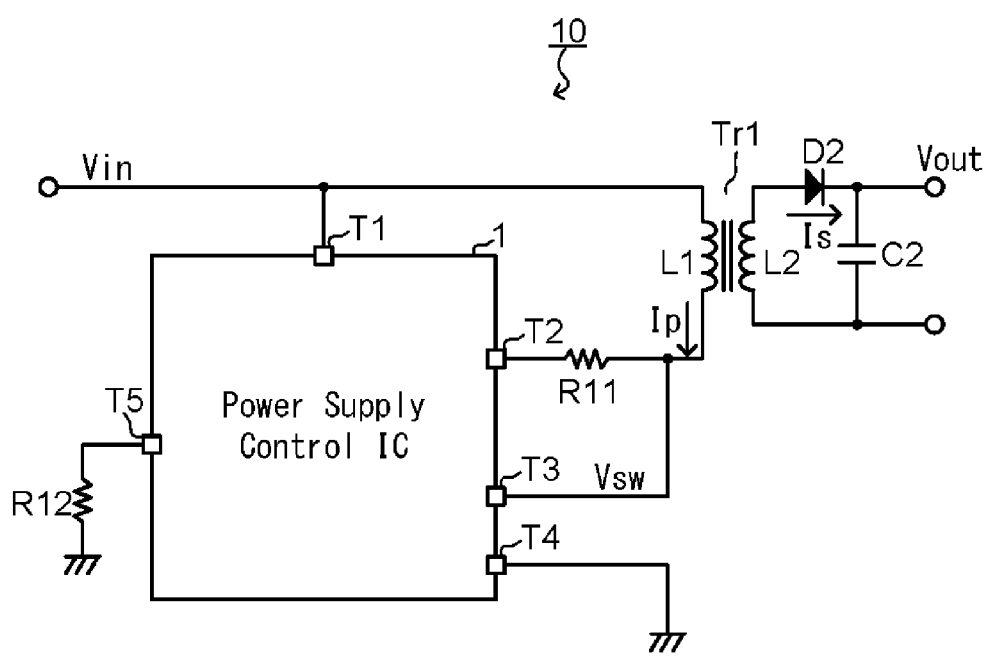
FIG. 1 is an overall structural diagram of an isolation type switching power supply device according to an embodiment of the present invention.

Hereinafter, an embodiment of the present invention is described with reference to the drawings. FIG. 1 is a diagram illustrating an overall structure of an isolation type switching power supply device 10 according to an embodiment of the present invention. The isolation type switching power supply device 10 is a flyback DC/DC converter that generates an output voltage Vout from an input voltage Vin. In addition, the isolation type switching power supply device 10 performs adaptive ON time control as a control method as described below.

The isolation type switching power supply device 10 includes a power supply control IC1 and various discrete components connected externally to the power supply control IC1 (a transformer Tr1, a diode D2, a smoothing capacitor C2, a resistor R11, and a resistor R12).

The power supply control IC1 (power supply control unit) is a main unit (semiconductor device) that integrally controls overall operation of the isolation type switching power supply device 10. The power supply control IC1 has a power supply terminal T1, a feedback terminal T2, a switching output terminal T3, a ground terminal T4, and a REF terminal T5, so as to establish electrical connections with the outside.

The input voltage Vin as a DC voltage is applied to the power supply terminal T1 and is applied to one terminal of a primary winding L1 of the transformer Tr1. The other terminal of the primary winding L1 is connected to the feedback terminal T2 via the external resistor R11 and is connected to the switching output terminal T3. One terminal of a secondary winding L2 of the transformer Tr1 is connected to an anode of the diode D2. A smoothing capacitor C2 is connected between a cathode of the diode D2 and the other terminal of the secondary winding L2. The output voltage Vout is generated at a connection node between one terminal of the capacitor C2 and the cathode of the diode D2. An application terminal of a ground potential is connected to the ground terminal T4. The REF terminal T5 is connected to one terminal of the external resistor R12.

Figure 2:
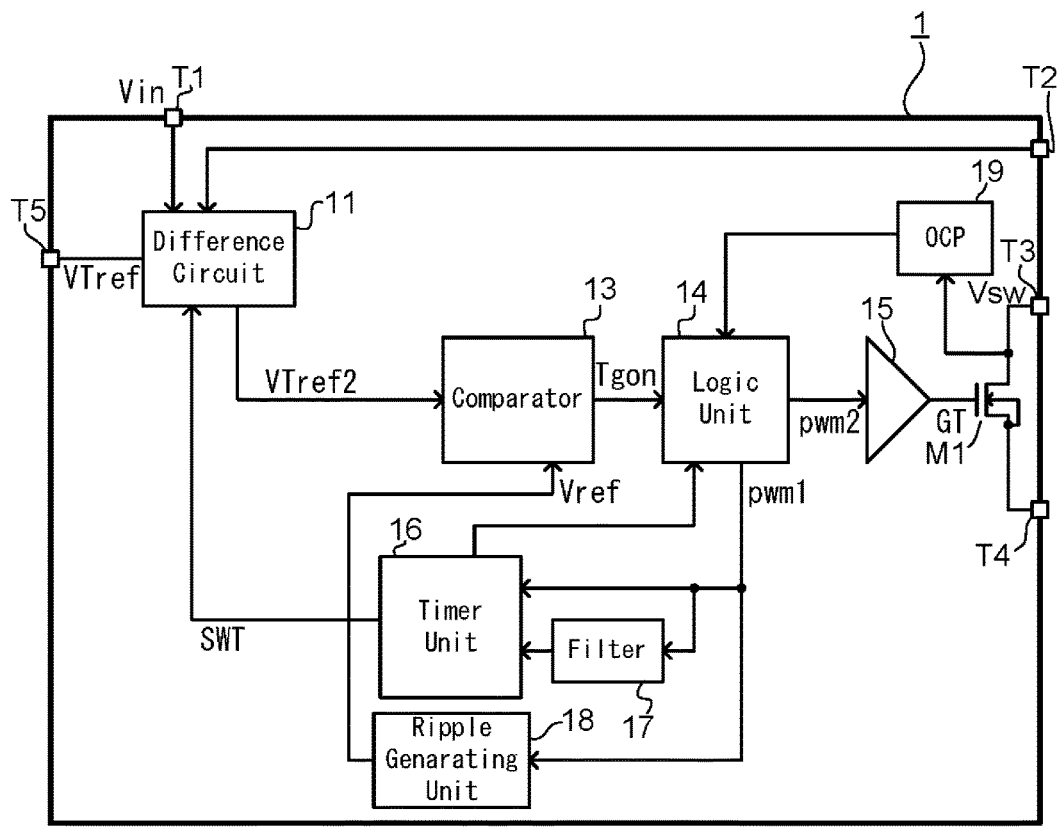
FIG. 2 is a block diagram showing an internal structure of a power supply control IC according to an embodiment of the present invention.

FIG. 2 is a block diagram showing an internal structure of the power supply control IC1. The power supply control IC1 includes a difference circuit 11, a comparator 13, a logic unit 14, a driver 15, a timer unit 16, a filter 17, a ripple generating unit 18, an overcurrent protection unit (OCP unit) 19, and a switching element M1, and these structural elements are integrated in a single chip.

A drain of the switching element M1 constituted of an N-channel metal-oxide-semiconductor field-effect transistor (MOSFET) is connected to one terminal of the primary winding L1 via the switching output terminal T3. A source of the switching element M1 is connected to the application terminal of the ground potential via the ground terminal T4.

When the switching element M1 is turned on, current flows in the primary winding L1 of the transformer Tr1, and excitation energy is stored in the transformer Tr1. In this case, the diode D2 is in OFF state. Next, when the switching element M1 is turned off, the stored excitation energy is discharged from the secondary winding L2 of the transformer Tr1 via the diode D2 and is smoothed by the smoothing capacitor C2, and thus the output voltage Vout is generated. In this case, current flows in the diode D2.

When the switching element M1 is turned off, a flyback voltage VOR expressed by the following equation (1) is generated in the primary winding L1;

$$VOR = Np/Ns \times (Vout + Vf) \qquad (1),$$

where Np represents the number of turns of the primary winding L1, Ns represents the number of turns of the secondary winding L2, and Vf represents forward voltage of the diode D2.

In this case, a switching voltage Vsw as a drain voltage of the switching element M1 is expressed by the following equation (2).

$$Vsw = Vin + VOR \quad (2)$$

The difference circuit 11 is connected to the power supply terminal T1 applied with the input voltage Vin, the feedback terminal T2 connected to the other terminal of the resistor R11 having one terminal applied with the switching voltage Vsw, and the REF terminal T5 connected to the one terminal of the resistor R12. In this way, the difference circuit 11 converts a difference between the switching voltage Vsw and the input voltage Vin into current with the resistor R11, and a REF terminal voltage VTref is generated at the REF terminal T5 by the current after the conversion and the resistor R12. In other words, the REF terminal voltage VTref is generated as a feedback signal of the flyback voltage VOR. The difference circuit 11 corresponds to a feedback signal output unit.

The difference circuit 11 performs an operation of outputting the REF terminal voltage VTref as it is as an output VTref2 when a switching element M11 is in OFF state, and an operation of holding the output VTref2 at a certain timing. The difference circuit 11 outputs the output VTref2 to the comparator 13.

The comparator 13 compares the output VTref2 with a reference voltage Vref having a triangular wave, for example, generated by the ripple generating unit 18, and outputs a result of the comparison as an FET on trigger signal Tgon to the logic unit 14. The comparator 13 corresponds to an on trigger signal generating unit.

The logic unit 14 generates a first PWM signal pwm1 and a second PWM signal pwm2. The first PWM signal pwm1 and the second PWM signal pwm2 are pulse-like signals having basically the same on duty.

The filter 17 filters the first PWM signal pwm1 so as to extract on duty information. The filter 17 corresponds to a duty information obtaining unit. The timer unit 16 and the logic unit 14 set an ON time, which is a period during which the switching element M1 is in ON state, on the basis of the on duty information from the filter 17. The logic unit 14 sets the second PWM signal pwm2 to Low level so as to switch the switching element M1 from ON to OFF state at timing when the set ON time comes.

In addition, the timer unit 16 and the logic unit 14 set a minimum OFF time as a minimum value of an OFF time, which is a period during which the switching element M1 is in OFF state, on the basis of the on duty information from the filter 17. The logic unit 14 sets the second PWM signal pwm2 to High level to switch the switching element M1 from OFF to ON state at timing based on the set minimum OFF time and the FET on trigger signal Tgon from the comparator 13.

The driver 15 generates a gate voltage GT on the basis of the second PWM signal pwm2 generated by the logic unit 14 and applies the gate voltage GT to the gate of the switching element M1. In this way, the switching element M1 is on/off controlled.

In addition, the timer unit 16 generates a switch timing signal SWT that instructs on/off timing of a switch (not shown) included in the difference circuit 11 and outputs the switch timing signal SWT to the difference circuit 11. When the switch timing signal SWT instructs to turn on, the difference circuit 11 outputs the REF terminal voltage VTref as it is as the output VTref2. When the switch timing signal SWT instructs to turn off, the difference circuit 11 holds the output VTref2 at switching timing from ON to OFF state.

<ON Time/OFF Time Setting Control>

Figure 3:
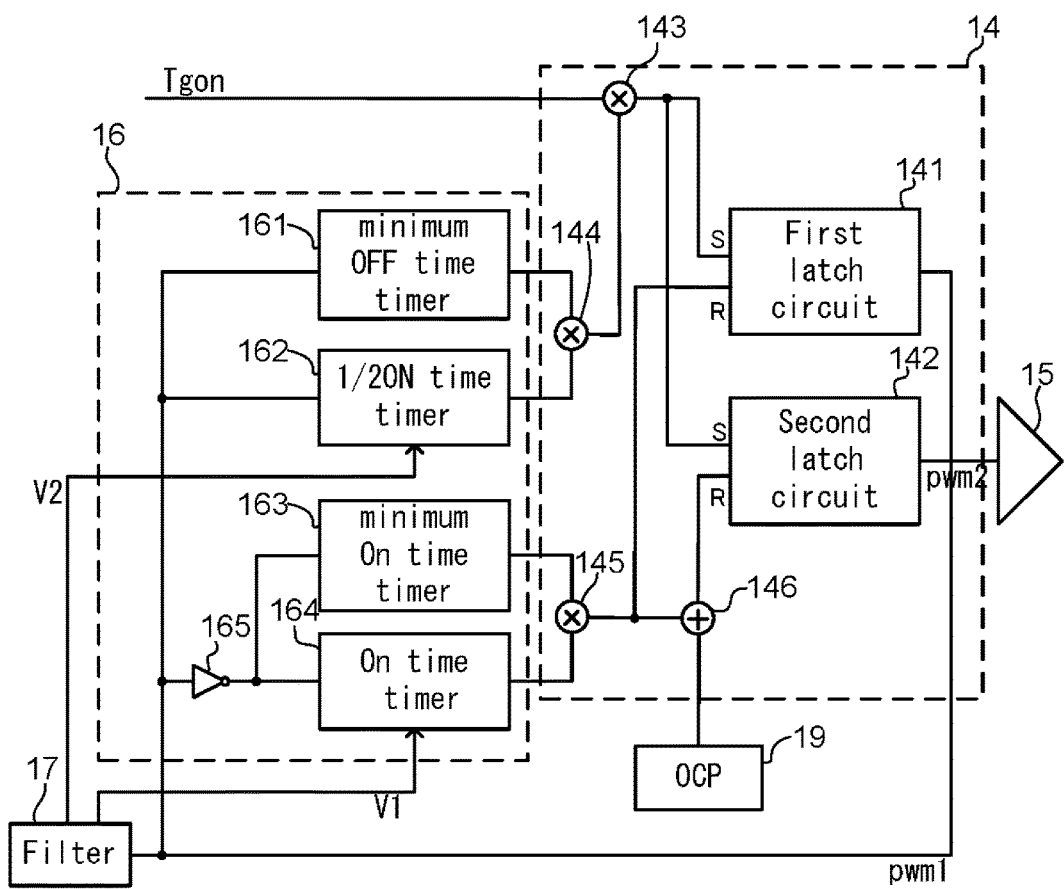
FIG. 3 is a diagram showing a specific structural example of a timer unit and a logic unit.

Next, control for setting ON time/OFF time by the power supply control IC1 according to this embodiment is described. FIG. 3 is a diagram showing a specific structural example of the timer unit 16 and the logic unit 14.

The timer unit 16 includes a minimum OFF time timer 161, a ½ ON time timer 162, a minimum ON time timer 163, an ON time timer 164, and an inverter 165. The logic unit 14 includes a first latch circuit 141, a second latch circuit 142, AND circuits 143 to 145, and an OR circuit 146. The first latch circuit 141 outputs the first PWM signal pwm1. The second latch circuit 142 outputs the second PWM signal pwm2 to the driver 15.

The first latch circuit 141 and the second latch circuit 142 are simultaneously set by a signal input to a set terminal, and are basically simultaneously reset (except when the OCP unit 19 detects overcurrent) by a signal input to a reset terminal. Therefore, the first PWM signal pwm1 and the second PWM signal pwm2 are synchronized and have the same on duty.

When the first latch circuit 141 is set and the first PWM signal pwm1 rises from Low to High level, i.e. when the switching element M1 is turned on by the second PWM signal pwm2, an output of the inverter 165 becomes Low level, and hence the minimum ON time timer 163 and the ON time timer 164 are reset.

After being reset, the minimum ON time timer 163 starts to measure a predetermined minimum ON time (fixed value). Here, the predetermined minimum ON time is a parameter that determines amount of overboost of the output voltage Vout. After being reset, the ON time timer 164 starts to measure an ON time set by a filter output voltage V1 generated by the filter 17 on the basis of the first PWM signal pwm1.

Figure 4:
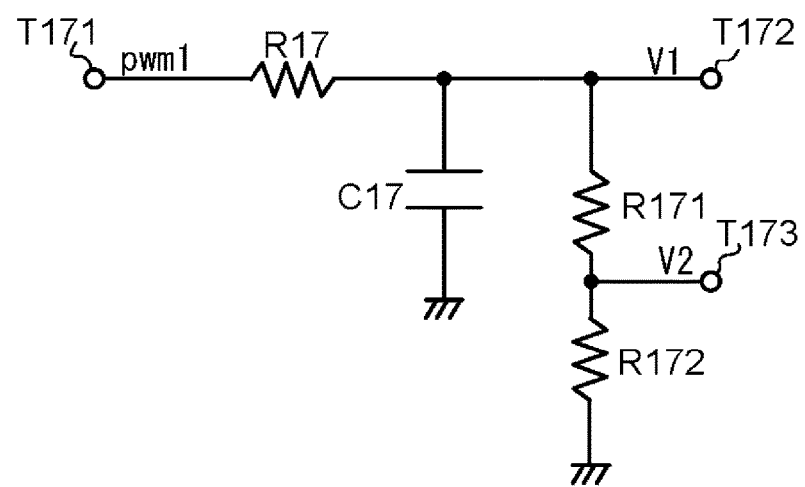
FIG. 4 is a diagram showing a structural example of a filter.

Here, FIG. 4 is a diagram showing a structural example of the filter 17. The filter 17 includes a resistor R17, a capacitor C17, and resistors R171 and R172 for voltage division. One terminal of the resistor R17 is connected to an input terminal T171 to which the first PWM signal pwm1 is applied. The other terminal of the resistor R17 is connected to one terminal of the capacitor C17 and is connected to a first output terminal T172 at which the filter output voltage V1 is generated. The other terminal of the capacitor C17 is connected to the application terminal of the ground potential. In other words, the resistor R17 and the capacitor C17 constitute a low pass filter, and the first PWM signal pwm1 passes through the low pass filter to be the filter output voltage V1. Therefore, the filter output voltage V1 indicates the on duty information of the first PWM signal pwm1.

Figure 5:
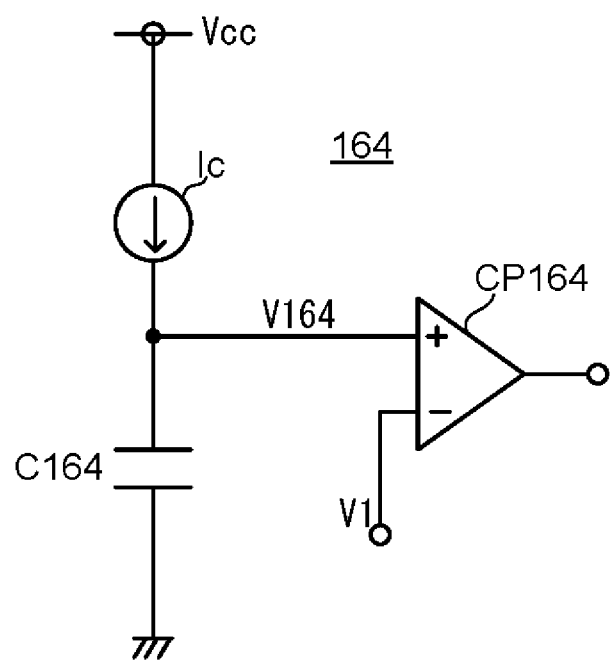
FIG. 5 is a diagram showing a structural example of an ON time timer.

In addition, FIG. 5 is a diagram showing a structural example of the ON time timer 164. The ON time timer 164 is a so-called ramp counter including a constant current circuit Ic, a capacitor C164, and a comparator CP164. The constant current circuit Ic and the capacitor C164 are connected in series between a power supply voltage Vcc and the ground potential, and the connection node between them is connected to a noninverting input terminal (+) of the comparator CP164. An inverting input terminal (−) of the comparator CP164 is applied with the filter output voltage V1. The output of the comparator CP164 is the output of the ON time timer 164.

When the ON time timer 164 is reset, charge stored in the capacitor C164 is discharged. Then, the current that is controlled to be constant by the constant current circuit Ic charges the capacitor C164. When the capacitor C164 is charged, the time t until the voltage V164 at the noninverting input terminal of the comparator CP164 reaches the filter output voltage V1 as the reference voltage is expressed by the following equation (3);

$$t = C \times V1/I \quad (3)$$

where C represents a capacitance of the capacitor C164, and I represents a constant current value.

The output of the comparator CP164 is at Low level when it is reset, but after the time t described above elapses and the voltage V164 at the noninverting input terminal of the comparator CP164 reaches the filter output voltage V1, the output of the comparator CP164 becomes High level.

Note that the minimum ON time timer 163 can be constituted of a ramp counter having the same structure as illustrated in FIG. 5. In this case, the reference voltage of the comparator, the constant current value of the constant current circuit, and the capacitance of the capacitor are appropriately set so that the time t described above will be the predetermined minimum ON time.

The output of the minimum ON time timer 163 and the output of the ON time timer 164 are input to the AND circuit 145. Using the AND circuit 145, the output of the AND circuit 145 becomes High level when both outputs of the minimum ON time timer 163 and the ON time timer 165 become High level. In other words, the output of the AND circuit 145 becomes High level at the timing when one of the predetermined minimum ON time measured by the minimum ON time timer 163 and the ON time measured by the ON time timer 164, which is longer, is measured. Therefore, if the ON time is shorter than the predetermined minimum ON time, the predetermined minimum ON time is dominant. The AND circuit 145 corresponds to an off timing determining unit.

The output of the AND circuit 145 is input to a reset terminal of the first latch circuit 141 and is input to the OR circuit 146. The OR circuit 146 is also supplied with an output of the OCP unit 19. An output of the OR circuit 146 is input to the second latch circuit 142. The output of the OCP unit 19 is Low level in a normal time where overcurrent is not detected, and hence both the first latch circuit 141 and the second latch circuit 142 are reset at timing when the output of the AND circuit 145 becomes High level. The OR circuit 146 and the second latch circuit 142 constitute an off control unit.

In this way, both the first PWM signal pwm1 and the second PWM signal pwm2 are switched to Low level, and the second PWM signal pwm2 turns off the switching element M1 so as to define the ON time.

When the first PWM signal pwm1 becomes Low level, both the minimum OFF time timer 161 and the ½ ON time timer 162 are reset. After being reset, the minimum OFF time timer 161 starts to measure a predetermined minimum OFF time (fixed value). When the switching element M1 is in OFF state, the difference circuit 11 outputs the REF terminal voltage VTref as it is or holds the output. Because ringing occurs in the switching voltage Vsw just after the switching element M1 is turned off, it is necessary to secure time until the ringing is stabilized, and therefore the predetermined minimum OFF time described above is determined.

The minimum OFF time timer can be constituted of a ramp counter having the same structure as illustrated in FIG. 5. In this case, the reference voltage of the comparator, the constant current value of the constant current circuit, and the capacitance of the capacitor are appropriately set so that the time t described above will be the predetermined minimum OFF time.

Figure 6:
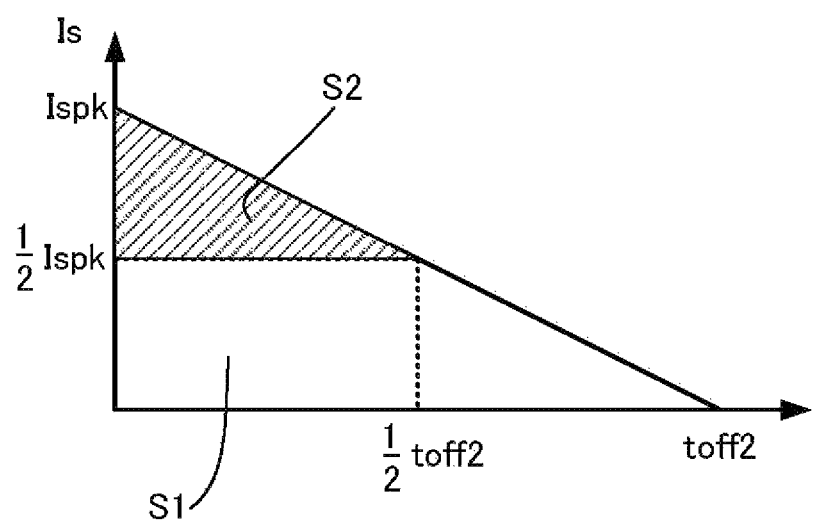
FIG. 6 is a diagram of an example showing a manner in which secondary side current is decreased when the switching element is turned off.

In addition, after being reset, the ½ ON time timer 162 starts to measure time that is 50% of the ON time. Here, when the switching element M1 is in ON state, primary side current Ip flowing in the primary winding L1 increases. When the switching element M1 is turned off, secondary side current Is flowing in the secondary winding L2 has a peak value that is obtained by multiplying the peak value of the primary side current by the turns ratio. Further, the secondary side current is gradually decreased as time elapses. FIG. 6 is a diagram of an example showing a manner in which the secondary side current Is is decreased when the switching element M1 is turned off. As shown in FIG. 6, the secondary side current Is is gradually decreased from peak value Ispk when the switching element M1 is turned off and becomes zero when a discharge time toff2 elapses. The discharge until the time that is 50% of the discharge time toff2 (½ toff2) has more discharge amount than an average discharge amount (area S1) by the discharge amount corresponding to area S2, and hence effective discharge can be performed. On the contrary, after the time that is 50% of the discharge time toff2, the efficiency is lowered.

Therefore, it is sufficient that the discharge time (i.e. the OFF time) can be elongated to 50% of the discharge time toff2. However, because the actual discharge time toff2 depends on the transformer Tr1 and a load condition, it is difficult to estimate it. Therefore, in this embodiment, as an index similar to 50% of the discharge time toff2, the OFF time is elongated to 50% of the ON time.

Specifically, in the structure of the filter 17 illustrated in FIG. 4, the filter output voltage V1 is divided by the resistors R171 and R172 having the same resistance so as to output the divided voltage as a filter output voltage V2 from a second output terminal T173. In this way, the filter output voltage V2 becomes 50% of the filter output voltage V1. Further, the ½ ON time timer 162 is constituted to have the same structure as the ramp counter illustrated in FIG. 5, and the filter output voltage V2 is applied as the reference voltage of the comparator. In this way, the ½ ON time timer 162 outputs High level when 50% of the ON time is measured after the output becomes Low level after being reset.

The AND circuit 144 is supplied with outputs of the minimum OFF time timer 161 and the ½ ON time timer 162. An output of the AND circuit 144 becomes High level when both outputs of the minimum OFF time timer 161 and the ½ ON time timer 162 become High level. In other words, one of the predetermined minimum OFF time and 50% of the ON time, which is longer, is selected and set as the minimum OFF time. The AND circuit 144 corresponds to a minimum OFF time setting unit.

Further, the AND circuit 143 is supplied with the FET on trigger signal Tgon and the output of the AND circuit 144. In this way, when both the FET on trigger signal Tgon and the output of the AND circuit 144 become High level, the output of the AND circuit 143 becomes High level. In other words, if the timing when the FET on trigger signal Tgon becomes High level is after the minimum OFF time set as described above elapses, the timing is selected. If the timing when the minimum OFF time set as described above elapses is after the timing when the FET on trigger signal Tgon becomes High level, the timing when the minimum OFF time elapses is selected. In other words, the OFF time is limited so as not to be shorter than the minimum OFF time. The AND circuit 143 corresponds to an on timing determining unit.

The output of the AND circuit 143 is input to the set terminals of the first latch circuit 141 and the second latch circuit 142. Therefore, at the timing when the output of the AND circuit 143 becomes High level, the first latch circuit 141 and the second latch circuit 142 are both set, and both the first PWM signal pwm1 and the second PWM signal pwm2 are switched to High level. In this way, the switching element M1 is turned on so as to define the OFF time.

When the output voltage Vout is decreased by a load fluctuation, the switching element M1 is turned on so as to determine the minimum OFF time set as described above as the OFF time. In this case, the on duty of the first PWM signal pwm1 is increased, and the ON time set by the filter output voltage V1 is elongated. In this way, by performing adaptive ON time control in which on duty information of the first PWM signal pwm1 is used to set the ON time, response characteristics to the load fluctuation can be improved.

Figure 7:
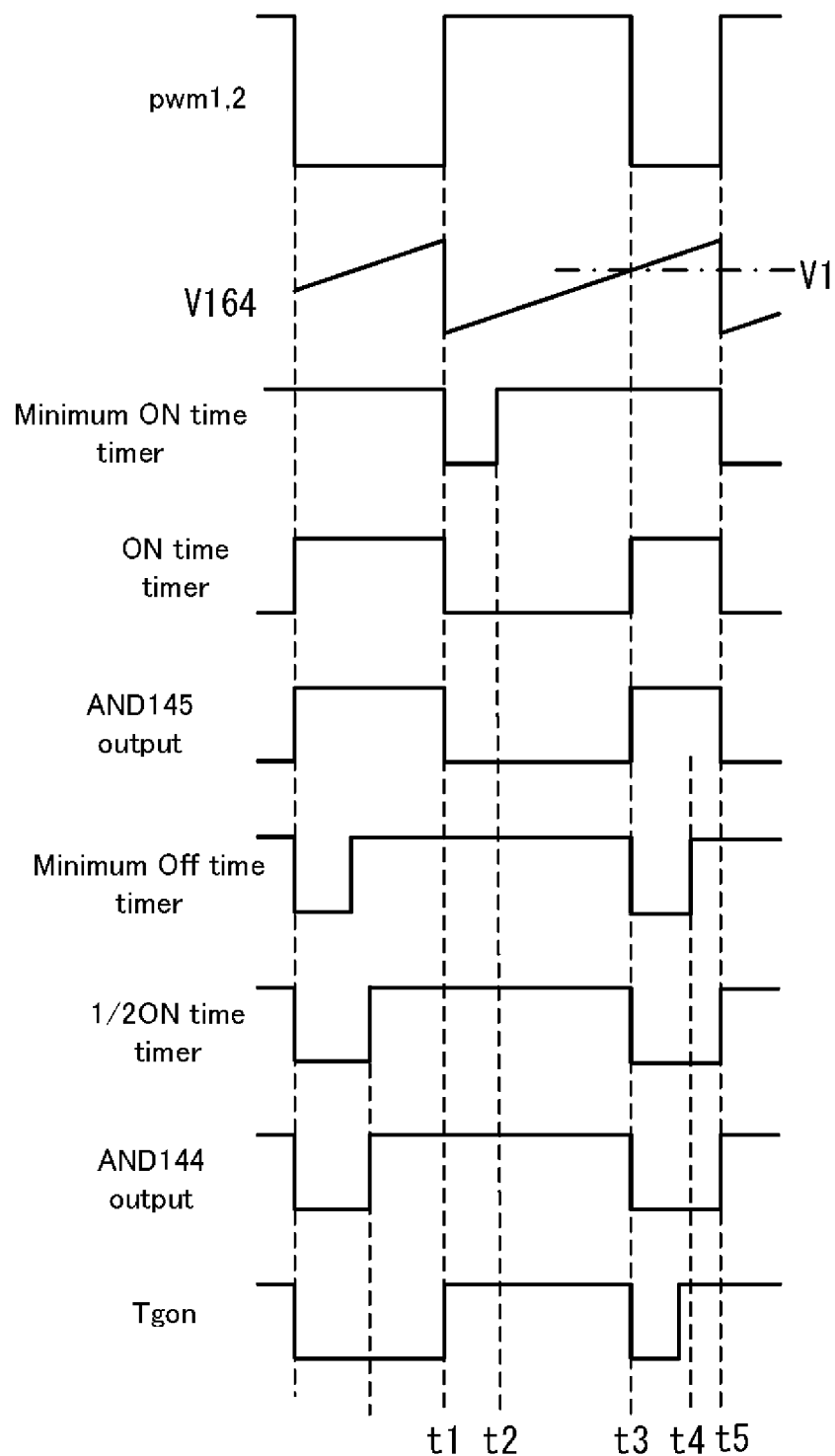
FIG. 7 is a timing chart showing an example of PWM signals and timer outputs of a transient response when an output voltage is decreased due to load fluctuation.

Here, FIG. 7 is a timing chart showing an example of PWM signals and timer outputs of a transient response when the output voltage Vout is decreased by the load fluctuation. Note that FIG. 7 also shows other signals including the voltage V164 at the noninverting input terminal of the comparator CP164 in the ON time timer 164 (FIG. 5), the outputs of the AND circuits 145 and 144, and the FET on trigger signal Tgon. At timing t1, both the first PWM signal pwm1 and the second PWM signal pwm2 become High level, and the switching element M1 is turned on. Then, both the minimum ON time timer 163 and the ON time timer 164 are reset, and the outputs of the timers become Low level. When the ON time timer 164 is reset, the capacitor C164 is discharged, and hence the voltage V164 becomes zero. After that, the constant current circuit Ic charges the capacitor C164, and hence the voltage V164 is increased at a predetermined speed.

Further, when the minimum ON time timer 163 measures the predetermined minimum ON time, the output of the minimum ON time timer 163 becomes High level (at timing t2). After that, when the voltage V164 reaches the filter output voltage V1 and the ON time timer 164 measures the ON time, the output of the ON time timer 164 becomes High level (at timing t3). At this timing, the output of the AND circuit 145 becomes High level, and hence the first latch circuit 141 and the second latch circuit 142 are both reset. Then, both the first PWM signal pwm1 and the second PWM signal pwm2 become Low level, and the switching element M1 is turned off.

In this case, the minimum OFF time timer 161 and the ½ ON time timer 162 are both reset, and the outputs of the timers become Low level. After that, the minimum OFF time timer 161 measures the predetermined minimum OFF time, and hence an output of the minimum OFF time timer 161 becomes High level (at timing t4). After that, when the ½ ON time timer 162 measures the time that is 50% of the ON time, the output of the ½ ON time timer 162 becomes High level (at timing t5). Here, because the FET on trigger signal Tgon becomes High level at timing before the timing t5, the output of the AND circuit 143 becomes High level at the timing t5. In this way, the first latch circuit 141 and the second latch circuit 142 are both set, and both the first PWM signal pwm1 and the second PWM signal pwm2 become High level. Thus, the switching element M1 is turned on.

In this way, because the time that is 50% of the ON time and is longer than the predetermined minimum OFF time is set as the minimum OFF time, compared with a case where the predetermined minimum OFF time is set as the OFF time, longer discharge time can be secured, and faster transient response can be achieved. Note that the predetermined ratio of 50% is an example, and some effect can be achieved by setting the ratio of 20% to 80%. In addition, on the basis of the filter output voltage V1 indicating the on duty information of the first PWM signal pwm1 and the voltage V164, the ON time timer 164 determines the ON time. In other words, the ON time timer 164 as an ON time setting unit determines the ON time based on a switching duty of the switching element M1. Further, the ½ ON time timer 162 measures the time that is 50% of the ON time set by the ON time timer 164.

Figure 8A:
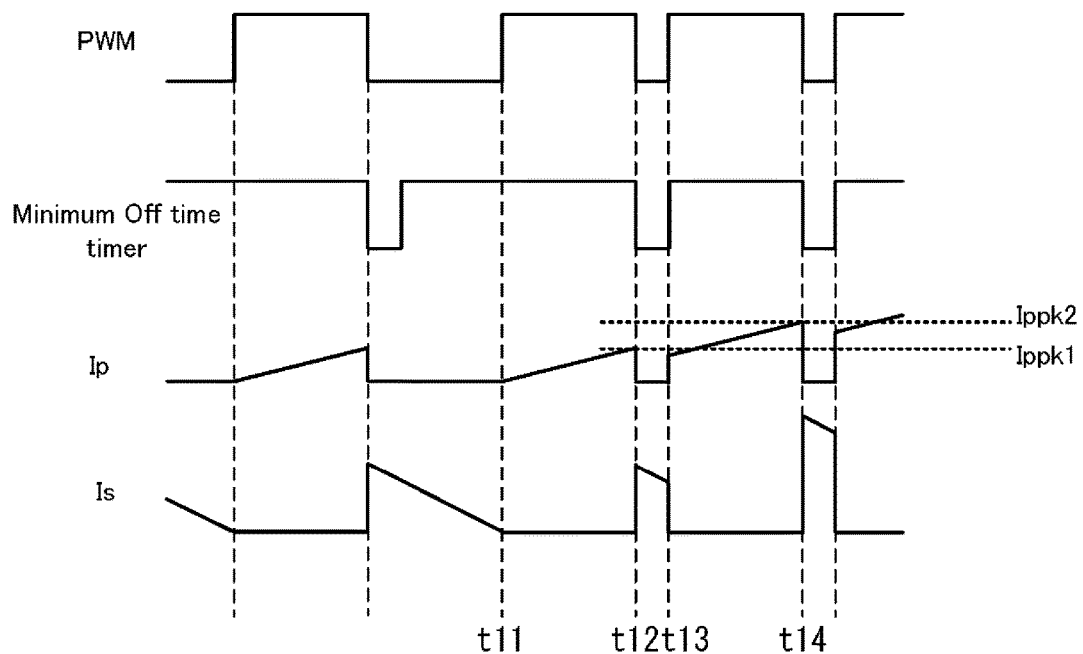
FIG. 8A is a timing chart showing waveform examples in a comparative example in which only a minimum OFF time timer is used.
Figure 8B:
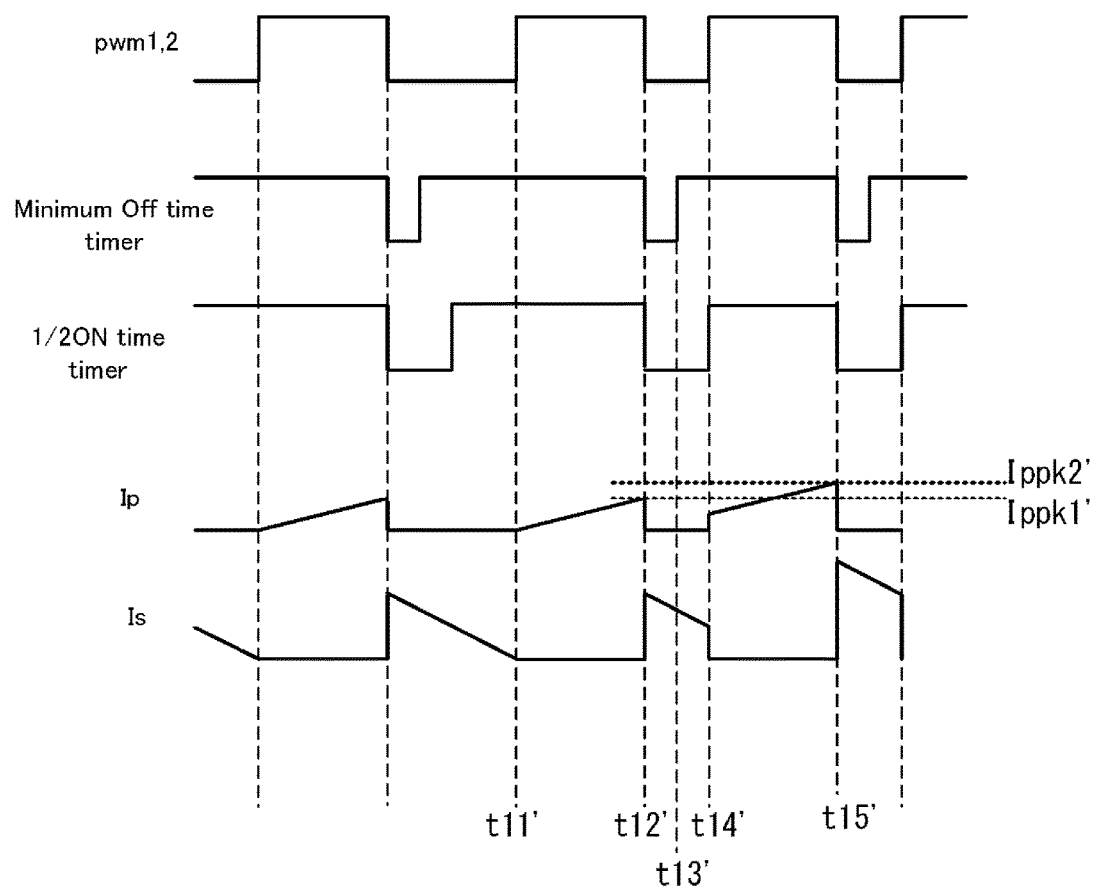
FIG. 8B is a timing chart of the embodiment of the present invention corresponding to FIG. 8A showing the comparative example.

In addition, a comparison with an embodiment in which the minimum OFF time is set by using only the minimum OFF time timer is described here with reference to FIGS. 8A and 8B. FIG. 8A is a timing chart showing an example of waveforms in the embodiment for comparison in which only the minimum OFF time timer is used. FIG. 8A shows an example of waveforms of the PWM signal, the output of the minimum OFF time timer, the primary side current Ip, and the secondary side current Is, from top to bottom.

FIG. 8A shows a case where the output voltage Vout is decreased by the load fluctuation after timing t11 when the PWM signal becomes High level and the switching element is turned on. During a period in which the switching element is ON state, the primary side current Ip is increased. At timing t12 when the PWM signal becomes Low level and the switching element is turned off, the minimum OFF time timer is reset, and then the measurement of the predetermined minimum OFF time is started. At timing t12, the primary side current Ip becomes zero, and the secondary side current Is is generated in accordance with the peak value of the primary side current Ip and is decreased after that.

The measurement of the minimum OFF time is completed at timing t13, and the output of the minimum OFF time timer becomes High level. Here, because the FET on trigger signal Tgon has become High level before the timing t13 due to the decrease of the output voltage Vout, the PWM signal becomes High level at the timing t13, and the switching element is turned on. Here, the secondary side current Is becomes zero, and the primary side current Ip is generated in accordance with a value of the secondary side current Is and then increases. Further, the PWM signal becomes Low level at timing t14, and the switching element is turned off. In this case, the primary side current Ip becomes zero.

FIG. 8B is a timing chart of this embodiment corresponding to FIG. 8A of the comparative example. FIG. 8B shows an example of waveforms of the first PWM signal pwm1 (and the second PWM signal pwm2), the output of the minimum OFF time timer 161, the output of the ½ ON time timer 162, the primary side current Ip, and the secondary side current Is, from top to bottom.

In FIG. 8B, at timing t12' when the first PWM signal pwm1 becomes Low level and the switching element M1 is turned off, both the minimum OFF time timer 161 and the ½ ON time timer 162 are reset, and each timer starts to measure time. Here, the primary side current Ip becomes zero, and the secondary side current Is occurs and then decreases. In FIG. 8B, the ½ ON time timer 162 completes measurement of 50% of the ON time at timing t14' after timing t13' when the minimum OFF time timer 161 completes measurement of the predetermined minimum OFF time. Here, because the FET on trigger signal Tgon has become High level before the timing t14' due to the decrease of the output voltage Vout, the first PWM signal pwm1 becomes High level at the timing t14', and the switching element M1 is turned on. Here, the secondary side current Is becomes zero, and the primary side current Ip is generated in accordance with a value of the secondary side current Is and then increases. Further, the first PWM signal pwm1 becomes Low level at timing t15', and the switching element M1 is turned off. In this case, the primary side current Ip becomes zero.

In FIG. 8B, compared with FIG. 8A, because the OFF time is defined at the timing when 50% of the ON time, which is longer than the predetermined minimum OFF time, is measured, the secondary side current Is is decreased down to a lower value by securing discharge time on the secondary side. In this way, the primary side current Ip generated when the switching element M1 is turned on can be decreased. Therefore, compared with an increase variation amount from a peak value Ippk1 to a peak value Ippk2 of the primary side current in FIG. 8A, an increase variation amount from a peak value Ippk1' to a peak value Ippk2' of the primary side current in FIG. 8B can reduced.

In addition, it is understood that a fluctuation in a switching period (switching frequency) can be smaller in FIG. 8B than in FIG. 8A.

Note that the time to be compared with the predetermined minimum OFF time is not limited to a fixed predetermined ratio (e.g. 50%) of the ON time, but the predetermined ratio may be controlled in a variable manner in accordance with a load condition.

<Operation in Overcurrent Protection>

Next, an operation of the isolation type switching power supply device 10 according to this embodiment in the overcurrent protection is described with reference to FIGS. 9A and 9B.

Figure 9A:
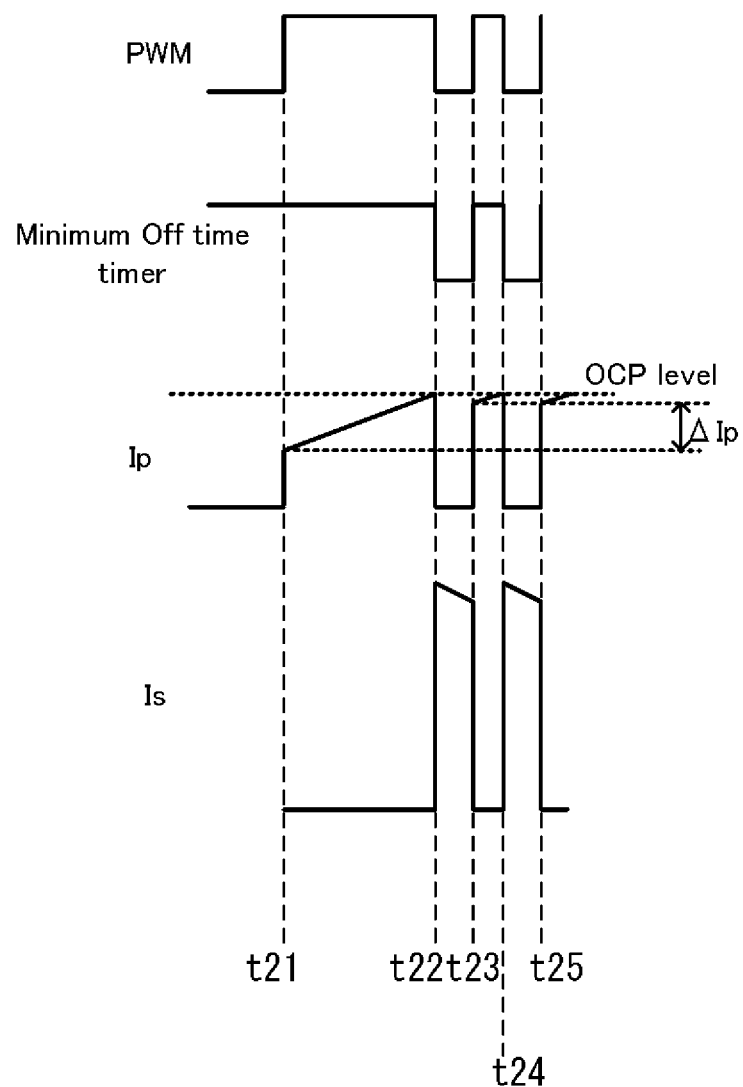
FIG. 9A is a timing chart showing an example of an operation of overcurrent protection in the isolation type switching power supply device according to the comparative example.

FIG. 9A is a timing chart showing an example of an operation of the isolation type switching power supply device according to a comparative example in the overcurrent protection for comparing with this embodiment. In FIG. 9A, the primary side current Ip starts to flow and then increases at timing t21 when the PWM signal becomes High level and the switching element is turned on. Further, the PWM signal becomes Low level at timing t22 when overcurrent occurs in the primary side current Ip and it is detected that the primary side current Ip has reached a predetermined OCP level, and the switching element is turned off. In this case, the primary side current Ip becomes zero, and the secondary side current Is occurs and then decreases.

The minimum OFF time timer is reset at timing t22, and starts to measure the predetermined minimum OFF time. Further, when measurement of the minimum OFF time is completed at timing t23, the PWM signal becomes High level, and the switching element is turned on. In this case, the secondary side current Is becomes zero, and the primary side current Ip starts to flow and then increases. Further, the PWM signal becomes Low level at timing t24 when it is detected that the primary side current Ip has reached the OCP level, and the switching element is turned off. In this case, the primary side current Ip becomes zero, and the secondary side current Is starts to flow.

Figure 9B:
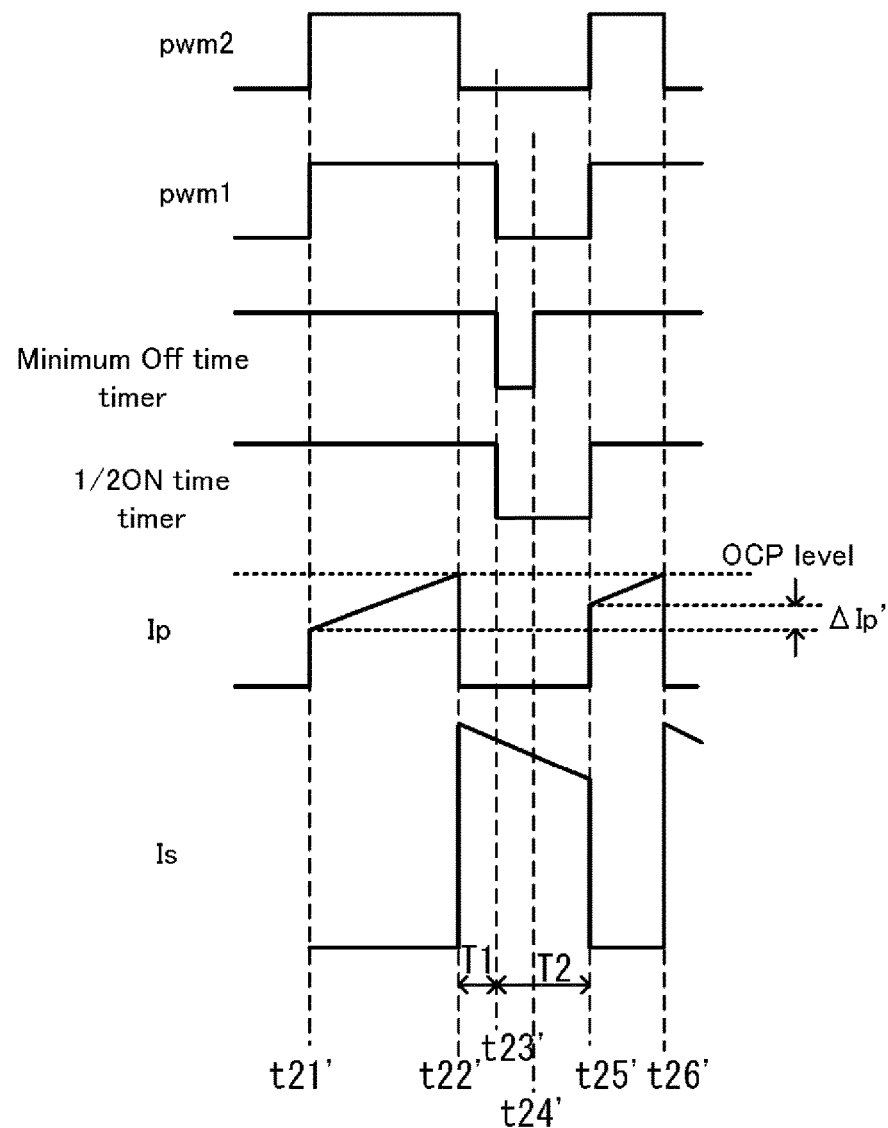
FIG. 9B is a timing chart showing an example of an operation of overcurrent protection in the isolation type switching power supply device according to the embodiment of the present invention.

In contrast, a timing chart of an example of an operation of this embodiment in the overcurrent protection is shown in FIG. 9B. Here, as illustrated in FIG. 2, the OCP unit 19 detects overcurrent by detecting that the switching voltage Vsw obtained by multiplying a current value of the primary side current Ip by an on-resistance of the switching element M1 has reached a predetermined reference voltage.

In FIG. 9B, at timing t21' when the first PWM signal pwm1 and the second PWM signal pwm2 become High level and the switching element is turned on, the primary side current Ip starts to flow and then increases. Further, when the OCP unit 19 detects overcurrent of the primary side current Ip at timing t22', the OCP unit 19 outputs the output signal of High level to the OR circuit 146 (FIG. 3). In this way, the output of the OR circuit 146 becomes High level, the second latch circuit 142 is reset, the second PWM signal pwm2 becomes Low level, and the switching element M1 is turned off. In this case, the primary side current Ip becomes zero, and the secondary side current Is stars to flow and then decreases.

However, the output of the AND circuit 145 is Low level at the timing t22', and the second PWM signal pwm2 becomes Low level because the primary side current Ip has reached the OCP level. However, the first latch circuit 141 is not reset, and the first PWM signal pwm1 holds High level. After that, at timing t23' when the output of the AND circuit 145 becomes High level, the first latch circuit 141 is reset, and the first PWM signal pwm1 becomes Low level. In this case, the minimum OFF time timer 161 and the ½ ON time timer 162 are both reset and start to measure time.

Further, after timing t24' when the minimum OFF time timer 161 completes measurement of the predetermined minimum OFF time, the ½ ON time timer 162 completes measurement of the 50% of the ON time at timing t25'. In addition, in this case, because the output voltage Vout is low due to an overcurrent state, the FET on trigger signal Tgon is already High level. Therefore, the first latch circuit 141 and the second latch circuit 142 are both set at timing 25', and both the first PWM signal pwm1 and the second PWM signal pwm2 become High level. In this way, the switching element M1 is turned on. In this case, the secondary side current Is becomes zero, and the primary side current Ip starts to flow and then increase.

Further, at timing t26' when the OCP unit 19 detects that the primary side current Ip has reached the OCP level, the second PWM signal pwm2 becomes Low level, and the switching element M1 is turned off. In this case, the primary side current Ip becomes zero, and the secondary side current Is starts to flow and then decreases.

In this way, in this embodiment, the switching element M1 is turned off at the timing t22' when the overcurrent is detected, but at the timing t23' after that, the first PWM signal pwm1 becomes Low level, and the minimum OFF time timer 161 and the ½ ON time timer 162 are reset. Therefore, the discharge time on the secondary side is elongated by period T1 between the timing t22' and the timing t23'. Further, in this embodiment, the ½ ON time timer 162 measures period T2 longer than the predetermined minimum OFF time so as to define the OFF time, and hence the discharge time is elongated more.

In this way, an increase variation amount ΔIp' that is a value when the primary side current Ip starts to flow as illustrated in FIG. 9B according to this embodiment can be smaller than an increase variation amount ΔIp that is a value when the primary side current Ip starts to flow as illustrated in FIG. 9A according to the comparative example. In FIG. 9A, because the increase variation amount ΔIp becomes large and the primary side current Ip soon reaches the OCP level (at the timing t24), charge time on the primary side is shortened and the output voltage increases slowly. In contrast, in FIG. 9B, by reducing the increase variation amount ΔIp', the time until the primary side current Ip reaches the OCP level (from the timing t25' to the timing t26') is elongated, and hence the charge time on the primary side is secured so that the increase speed of the output voltage Vout can be increased.

<Output Timing Control of Difference Circuit>

Figure 10:
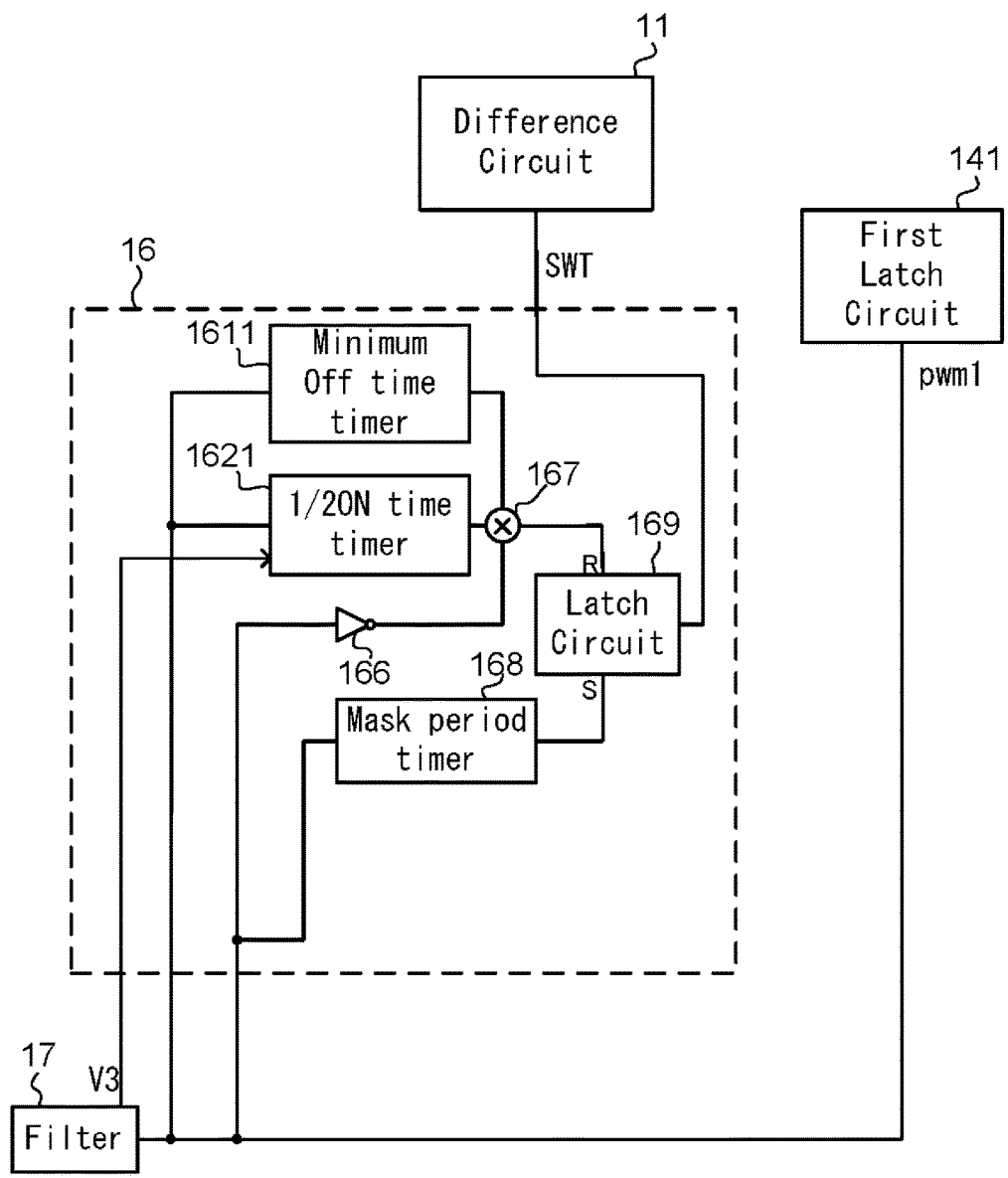
FIG. 10 is a diagram showing a structure for controlling output timing of a difference circuit.

Next, output timing control of the difference circuit 11 in the isolation type switching power supply device 10 according to this embodiment is described. As described above, the difference circuit 11 outputs the REF terminal voltage VTref as it is or holds the output when the switching element M1 is in OFF state. A structure for controlling the output timing of the difference circuit 11 is illustrated in FIG. 10. The timer unit 16 illustrated in FIG. 10 corresponds to a timing control unit.

The timer unit 16 illustrated in FIG. 10 includes a minimum OFF time timer 1611, a ½ ON time timer 1621, an inverter 166, an AND circuit 167, a mask period timer 168, and a latch circuit 169. Note that the timer unit 16 illustrated in FIG. 10 is the same as the timer unit 16 illustrated in FIG. 3 described above. In other words, although the structure illustrated in FIG. 10 is not shown in the timer unit 16 illustrated in FIG. 3, the structure is actually included in the timer unit 16.

The minimum OFF time timer 1611 measures time that is 95% of the predetermined minimum OFF time measured by the minimum OFF time timer 161. The ½ ON time timer 1621 is constituted in the same manner as the ramp counter illustrated in FIG. 5, and an output voltage V3 output from the filter 17 is applied as the reference voltage to the comparator. The output voltage V3 is a voltage that is 95% of the output voltage V2 described above (FIG. 4). In this way, the ½ ON time timer 1621 measures time that is 95% of 50% of the ON time. Note that the ratio of 95% for the minimum OFF time timer 1611 and the ½ ON time timer 1621 is merely an example, and other ratio may be used as long as it is less than 100% (e.g. a ratio of 70% or larger).

The inverter 166 is supplied with the first PWM signal pwm1 output from the first latch circuit 141. Outputs of the minimum OFF time timer 1611, the ½ ON time timer 1621, and the inverter 166 are input to the AND circuit 167. An output of the AND circuit 167 is input to the reset terminal of the latch circuit 169.

The mask period timer 168 measures a predetermined mask period (e.g. 240 nsec). The output of the mask period timer 168 is input to the set terminal of the latch circuit 169. The output of the latch circuit 169 is input to the difference circuit 11 as the switch timing signal SWT.

Operation of this structure is described below. When the first PWM signal pwm1 (as well as the second PWM signal pwm2) becomes Low level and the switching element M1 is turned off, the mask period timer 168 is reset and starts to measure time. Then the output of the mask period timer 168 becomes Low level, and the output of the inverter 166 becomes High level. In this case, both the minimum OFF time timer 1611 and the ½ ON time timer 1621 are reset and start to measure time, and the outputs of the timers become Low level. Note that the outputs of the timers become High level when the timers complete time measurement.

When the mask period timer 168 measures the predetermined mask period, its output becomes High level. Then, the latch circuit 169 is set, and the switch timing signal SWT becomes High level. In this way, a switch (not shown) included in the difference circuit 11 is turned on, and the difference circuit 11 starts operation to output the REF terminal voltage VTref as it is as the output VTref2.

After that, the AND circuit 167 becomes High level at one of the timing when the minimum OFF time timer 1611 has measured 95% of the predetermined minimum OFF time and the timing when the ½ ON time timer 1621 has measured 95% of 50% of the ON time, which is later. Then, the latch circuit 169 is reset, and the switch timing signal SWT becomes Low level. In this way, the switch included in the difference circuit 11 is turned off, and the difference circuit 11 holds the output VTref2 at switching timing from ON to OFF state.

Figure 11:
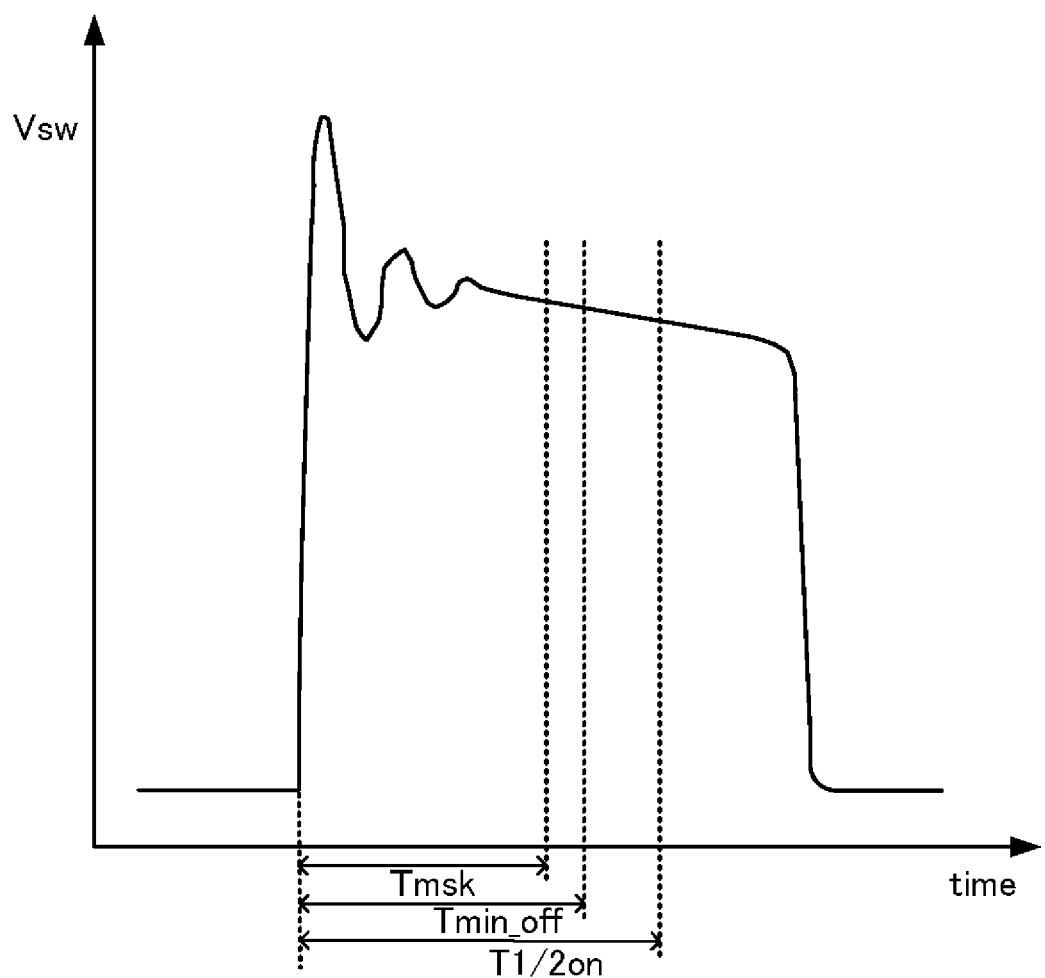
FIG. 11 is a graph showing a waveform example of a switching voltage when the switching element is turned off.

Here, a waveform example of the switching voltage Vsw when the switching element M1 is turned off is shown in FIG. 11. As shown in FIG. 11, just after the switching element M1 is turned off, ringing occurs in the switching voltage Vsw due to leakage inductance of the primary winding L1 of the transformer Tr1. Accordingly, masking is performed for a mask period Tmsk using the mask period timer 168, so as not to perform the operation of outputting the REF terminal voltage VTref as it is for the period during which ringing occurs.

When the mask period Tmsk elapses, the operation of outputting the REF terminal voltage VTref as it is is started. After that, when one of time Tmin_off that is 95% of the predetermined minimum OFF time and time T½ on that is 95% of 50% of the ON time, which is longer, elapses, the output is held (T½ on is longer in the example of FIG. 11). If Tmin_off is longer, the switching element M1 is turned on after the timing when the predetermined minimum OFF time elapses. If T½ on is longer, the switching element M1 is turned on after the timing when 50% of the ON time elapses. Therefore, because the timing when the output is held is before the timing when the switching element M1 is turned on, the output can be held while the secondary side current Is is flowing. In other words, it is possible to prevent occurrence of abnormality in the output due to coincidence between the timing when the switching element M1 is turned on and the timing when the output is held.

In addition, the REF terminal voltage VTref is the feedback signal of the flyback voltage VOR, and the flyback voltage VOR is expressed by the equation (1) described above. In the equation (1), a portion corresponding to the forward voltage Vf of the diode D2 is an error portion. Therefore, as the secondary side current Is becomes closer to zero, Vf becomes smaller, and the error becomes smaller. In other words, as time elapses more, the timing for holding the output becomes more appropriate. If T½ on is longer than Tmin_off, the timing for holding the output can be later.

<Variation of Switching Element>

Figure 12:
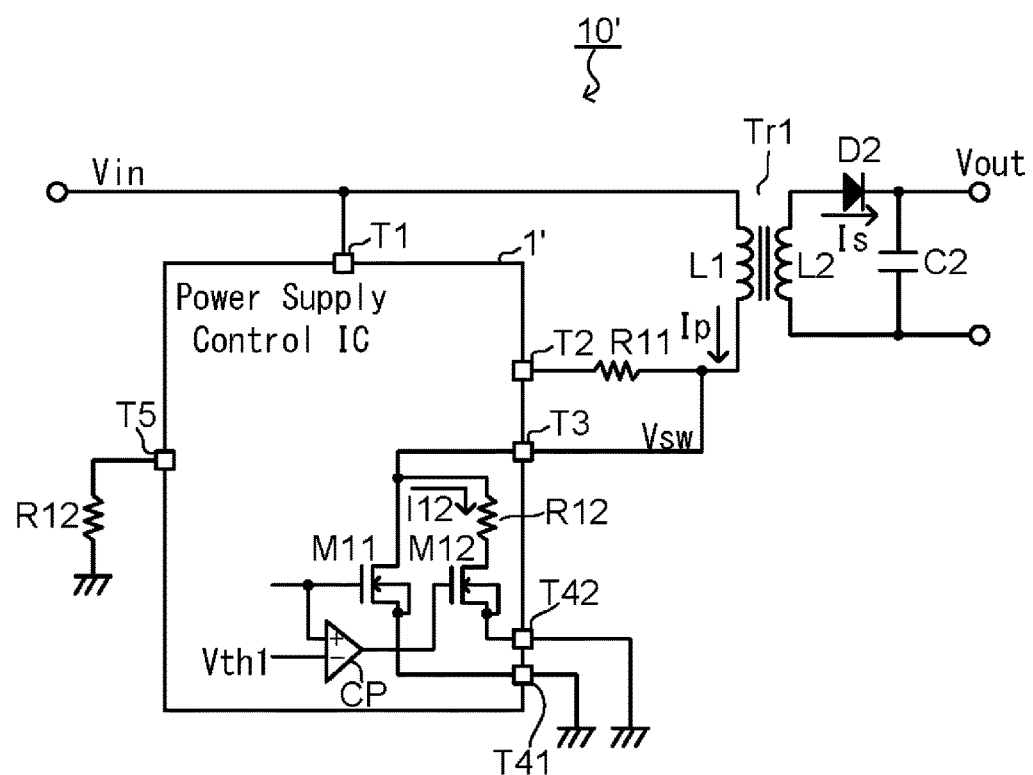
FIG. 12 is an overall structural diagram of an isolation type switching power supply device according to a variation of the present invention.

Next, there is described a variation of the isolation type switching power supply device according to this embodiment described above. A structure of an isolation type switching power supply device 10' according to the variation is illustrated in FIG. 12. The isolation type switching power supply device 10' illustrated in FIG. 12 includes a power supply control IC1'.

The power supply control IC1' has a structure including the main switching element M11, a sub-switching element M12, the resistor R12, and a comparator CP. Note that in the power supply control IC1', structural portions other than those illustrated in FIG. 12 are similar to those of the embodiment described above (FIG. 2).

The main switching element M11 constituted of an N-channel MOSFET is a switching element that is switching-driven so as to contribute to generation of the output voltage Vout in the isolation type switching power supply device 10'. The drain (current input terminal) of the main switching element M11 is connected to the switching output terminal T3, and the source (current output terminal) of the same is connected to a ground terminal T41.

The sub-switching element M12 is constituted of an N-channel MOSFET. The drain (current input terminal) of the sub-switching element M12 is connected to a connection node between the drain of the main switching element M11 and the switching output terminal T3 via the resistor R12.

The source (current output terminal) of the sub-switching element M12 is connected to a ground terminal T42.

The gate (control terminal) of the main switching element M11 is connected to an output terminal of a not-shown driver. The noninverting input terminal (+) of the comparator CP is connected to the gate of the switching element M11. The inverting input terminal (−) of the comparator CP is applied with a predetermined threshold value voltage Vth1 as the reference voltage. The output terminal of the comparator CP is connected to the gate (control terminal) of the sub-switching element M12. The comparator CP corresponds to a voltage applying unit.

Figure 13:
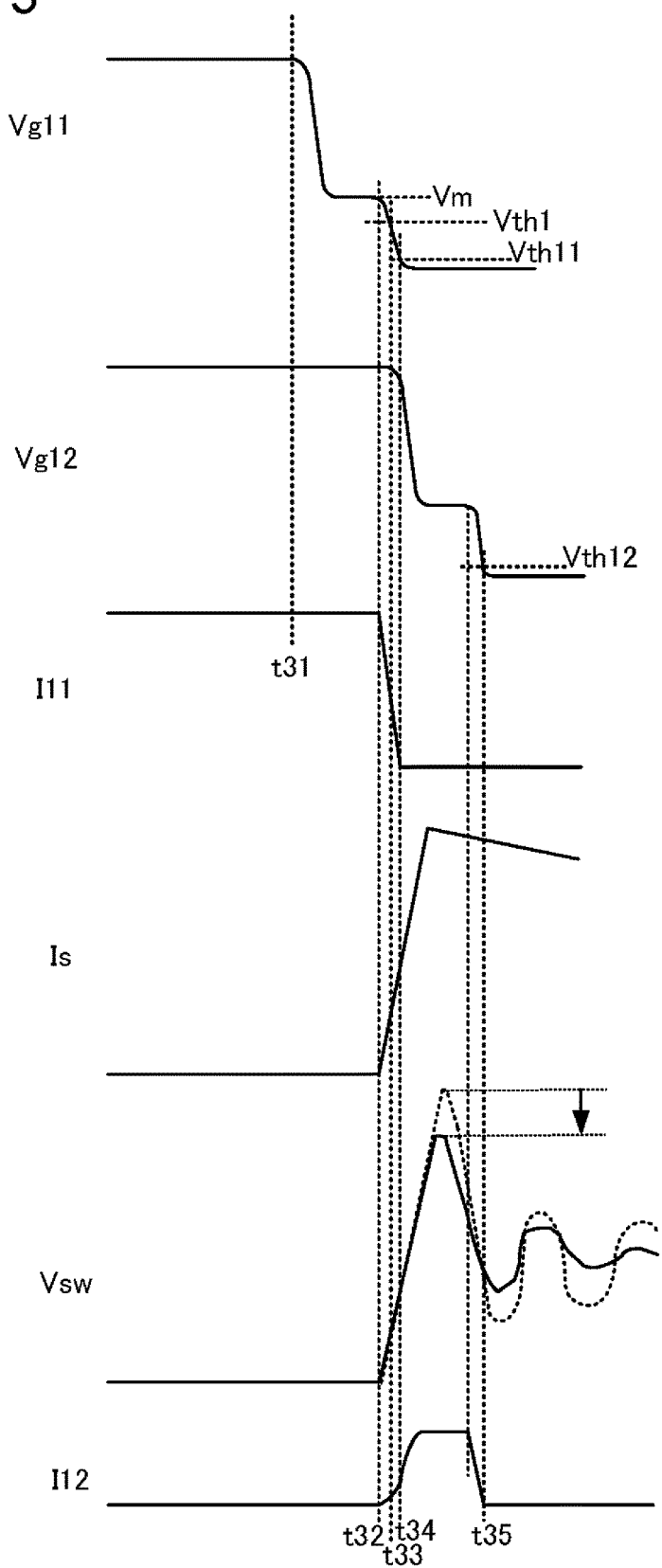
FIG. 13 is a timing chart showing waveform examples when a main switching element is turned off in the isolation type switching power supply device according to the variation of the present invention.

Here, an operation of a structure using the main switching element M11 and the sub-switching element M12 is described with reference to FIG. 13. FIG. 13 is a timing chart showing an example of waveforms when the main switching element M11 is turned off. FIG. 13 shows a gate voltage Vg11 of the main switching element M11, a gate voltage Vg12 of the sub-switching element M12, a current (drain current) I11 flowing in the main switching element M11, the secondary side current Is, the switching voltage Vsw, and a current (drain current) I12 flowing in the sub-switching element M12, from top to bottom.

When the main switching element M11 is in ON state (the sub-switching element M12 is in OFF state), drawing charge from a gate capacitor of the main switching element M11 is started at timing t31, in order to turn off the main switching element M11 with a not-shown driver. Then, the gate voltage Vg11 of the main switching element M11 is decreased. Further, after the gate voltage Vg11 reaches a mirror voltage Vm, at timing t32 when the gate voltage Vg11 decreases from the mirror voltage Vm, the current I11 starts to decrease, and the switching voltage Vsw starts to increase. Further, when the gate voltage Vg11 reaches the threshold value voltage Vth1, the output of the comparator CP becomes Low level (at timing t33). In this way, drawing charge from a gate capacitor of the sub-switching element M12 is stared, and the gate voltage Vg12 starts to decrease. Further, when the gate voltage Vg11 reaches the threshold value voltage Vth11 of the main switching element M11, the current I11 becomes zero (at timing t34).

In the period from the timing t32 to timing t35 when the gate voltage Vg12 reaches the threshold value voltage Vth12 of the sub-switching element M12, current I12 flows in the sub-switching element M12 in ON state. At the timing t35, the sub-switching element M12 is turned off, and the current I12 stops to flow. Therefore, in the period from the timing t32 to the timing t34 when the current I11 of the main switching element M11 becomes zero, both the main switching element M11 and the sub-switching element M12 are in ON state. Further, in the period from the timing t34 to the timing t35, the main switching element M11 is in OFF state, and the sub-switching element M12 is in ON state. Further, after the timing t35, both the main switching element M11 and the sub-switching element M12 are turned off.

Here, the primary winding L1 of the transformer Tr1 has a leakage inductance, and current flows also in the leakage inductance so as to store energy when the switching element is in ON state, but without any coupling with other windings, power transition is not performed. In this way, if the sub-switching element M12 is not disposed, large ringing occurs for long period in the switching voltage Vsw when the main switching element M11 is turned off.

Accordingly, in this embodiment, as the sub-switching element M12 is disposed, ringing that may occur in the switching voltage Vsw can be reduced by allowing the current I12 to flow in the sub-switching element M12 when the main switching element M11 is turned off. FIG. 13 shows that a peak value of the ringing generated in the switching voltage Vsw without the sub-switching element M12 (a broken line) can be reduced to a peak value of the switching voltage Vsw in this embodiment shown by a solid line.

Conventionally, a Snubber circuit may be used in order to reduce the ringing, but a Snubber circuit is difficult to design for a user. If the design is failed, the switching element may be broken. According to this embodiment, the ringing can be reduced without using such a Snubber circuit.

As described above, the threshold value voltage Vth1 of the comparator CP is set to a value between the mirror voltage Vm of the main switching element M11 and the threshold value voltage Vth11 of the main switching element M11 itself. The reason for that is described below. First, the current I11 flowing in the main switching element M11 decreases after the gate voltage Vg11 is decreased from the mirror voltage Vm and becomes zero when the gate voltage Vg11 reaches the threshold value voltage Vth11. If the threshold value voltage Vth1 is set to the mirror voltage Vm or higher, almost no current flows in the sub-switching element M12 during the period in which the gate voltage Vg11 is the threshold value voltage Vth1 to the mirror voltage Vm, and hence the sub-switching element M12 does not function during the period. On the other hand, if the threshold value voltage Vth1 is set to the threshold value voltage Vth11 or lower, the timing when the gate voltage Vg12 reaches the threshold value voltage Vth12 is delayed, and the current I12 flows excessively in the sub-switching element M12. Therefore, it is preferred to set the threshold value voltage Vth1 to a value lower than the mirror voltage Vm, and it is more preferred to set the same to a value between the mirror voltage Vm and the threshold value voltage Vth11.

In addition, the resistor R12 is provided for limiting the current I12. When the main switching element M11 is in ON state, there is the period (from the timing t32 to the timing t34) in which the sub-switching element M12 is turned on. In this period, as the current flowing from the switching output terminal T3 to the ground terminals T41 and T42, the current flows in the main switching element M11 having low resistance, and almost no current flows in the sub-switching element M12 because of the resistor R12. If the current I12 is allowed to flow excessively, rising voltage of the switching voltage Vsw becomes abnormally low when the main switching element M11 is turned off.

In addition, in this embodiment, it is preferred that the main switching element M11 and the sub-switching element M12 be manufactured by the same process, and the main switching element M11 has a larger size than the sub-switching element M12 (e.g. 1000:1). As being manufactured by the same process, the main switching element M11 and the sub-switching element M12 have the same variation and the same characteristics. Therefore, the time after the gate voltage starts to decrease until it becomes zero (or until it reaches the threshold value voltage of the switching element) is substantially the same between the main switching element M11 and the sub-switching element M12. Therefore, when the current I11 of the main switching element M11 becomes zero, it is secured that the sub-switching element M12 is in ON state. In addition, if the size of the main switching element M11 is large, large current flows in a steady ON state, and capacitance of a parasitic capacitor that causes a resonance phenomenon also becomes large. Thus, the effect of reducing the ringing by the sub-switching element M12 becomes large.

Note that instead of using the comparator CP as described above, it is possible to adopt a structure of using a delay circuit such as a filter that delays the voltage to be applied to the gate of the main switching element M11 and applies the delayed voltage to the gate of the sub-switching element M12. For example, the delay time elapses before the current I11 of the main switching element M11 becomes zero, and the sub-switching element M12 keeps its ON state when the current of the main switching element M11 is zero. Thus, ringing can be reduced.

<Others>

Although the embodiment of the present invention is described above, the embodiment can be variously modified within the scope of the spirit of the present invention.

For example, the switching element may be disposed externally of the power supply control IC instead of being included in the same.

In addition, the isolation type switching power supply device according to the present invention may be appropriately used for an industrial inverter such as a solar inverter, an FA inverter, or a power storage system.

What is claimed is:

1. A power supply control unit used for an isolation type flyback switching power supply device including a transformer having a primary winding and a secondary winding, and a switching element, one terminal of the primary winding being connected to an application terminal of an input voltage, while the other terminal of the primary winding being connected to the switching element, the power supply control unit comprising:
   an on trigger signal generating unit arranged to generate an on trigger signal for turning on the switching element on the basis of a feedback signal of a flyback voltage;
   a first timer arranged to measure a predetermined minimum OFF time;
   a second timer arranged to measure time based on ON time;
   a minimum OFF time setting unit arranged to compare the predetermined minimum OFF time measured by the first timer with the time measured by the second timer so as to set a longer time as a minimum OFF time; and
   an on timing determining unit arranged to determine timing for turning on the switching element on the basis of the set minimum OFF time and the on trigger signal.

2. The power supply control unit according to claim 1, wherein the second timer measures time that is a predetermined ratio of the ON time.

3. The power supply control unit according to claim 1, further comprising:
   a duty information obtaining unit arranged to obtain duty information on the basis of a PWM signal corresponding to PWM drive of the switching element;
   a third timer arranged to measure ON time on the basis of the obtained duty information; and
   an off timing determining unit arranged to determine timing for turning off the switching element on the basis of the ON time measured by the third timer, wherein
   the second timer measures time on the basis of the duty information.

4. The power supply control unit according to claim 1, wherein the minimum OFF time setting unit is an AND circuit.

5. The power supply control unit according to claim 1, wherein the on timing determining unit is an AND circuit.

6. An isolation type switching power supply device comprising:
   the power supply control unit according to claim 1;
   a switching element; and
   a transformer.

7. The power supply control unit according to claim 2, wherein the predetermined ratio is 20% to 80%.

8. The power supply control unit according to claim 3, wherein
   the duty information obtaining unit is a low pass filter to which the PWM signal is input, and
   the duty information is obtained as output voltage of the low pass filter.

9. The power supply control unit according to claim 7, wherein the predetermined ratio is 50%.

10. The power supply control unit according to claim 8, wherein
   each of the second timer and the third timer includes a capacitor, a constant current circuit arranged to charge the capacitor, and a comparator to which voltage of the capacitor and reference voltage are input,
   output voltage of the low pass filter is the reference voltage of the third timer, and
   voltage that is a predetermined ratio of the output voltage of the low pass filter is the reference voltage of the second timer.

11. A power supply control unit used for an isolation type flyback switching power supply device including a transformer having a primary winding and a secondary winding, and a switching element, one terminal of the primary winding being connected to an application terminal of an input voltage, while the other terminal of the primary winding being connected to the switching element, the power supply control unit comprising:
   an ON time setting unit arranged to set an ON time on the basis of switching duty of the switching element;
   an on trigger signal generating unit arranged to generate an on trigger signal for turning on the switching element on the basis of a feedback signal of flyback voltage;
   a first timer arranged to measure a predetermined minimum OFF time;
   a second timer arranged to measure time based on the ON time set by the ON time setting unit;
   a minimum OFF time setting unit arranged to compare the predetermined minimum OFF time measured by the first timer with the time measured by the second timer so as to set a longer time as a minimum OFF time; and
   an on timing determining unit arranged to determine timing for turning on the switching element on the basis of the set minimum OFF time and the on trigger signal.

12. An isolation type switching power supply device comprising:
   the power supply control unit according to claim 11;
   a switching element; and
   a transformer.

13. A power supply control unit used for an isolation type flyback switching power supply device including a transformer having a primary winding and a secondary winding, and a switching element, one terminal of the primary winding being connected to an application terminal of an input voltage, while the other terminal of the primary winding being connected to the switching element, the power supply control unit comprising:
   an OCP unit (overcurrent protection unit) arranged to detect overcurrent of primary side current;

an off control unit arranged to turn off the switching element when the overcurrent is detected;
a first timer arranged to measure a predetermined minimum OFF time at timing delayed from turning off by the off control unit;
an on trigger signal generating unit arranged to generate an on trigger signal for turning on the switching element on the basis of a feedback signal of flyback voltage; and
an on timing determining unit arranged to determine timing for turning on the switching element on the basis of the measured minimum OFF time and the on trigger signal.

14. The power supply control unit according to claim 13, further comprising:
a second timer arranged to start measurement of time that is a predetermined ratio of ON time at the same timing as the first timer; and
a minimum OFF time setting unit arranged to compare the predetermined minimum OFF time measured by the first timer with the time measured by the second timer so as to set a longer time as a minimum OFF time, wherein
the on timing determining unit determines timing for turning on the switching element on the basis of the set minimum OFF time and the on trigger signal.

15. The power supply control unit according to claim 13, wherein the on timing determining unit is an AND circuit.

16. The power supply control unit according to claim 13, further comprising:
a third timer arranged to measure ON time;
a first latch circuit to which output of the third timer is input;
an OR circuit to which output of the OCP unit and output of the third timer are input; and
a second latch circuit to which output of the OR circuit is input, wherein
the off control unit includes the OR circuit and the second latch circuit,
a second PWM signal output from the second latch circuit is input to a driver arranged to drive the switching element,
a first PWM signal output from the first latch circuit is input to the first timer, and
output of the on timing determining unit is input to the first latch circuit and to the second latch circuit.

17. An isolation type switching power supply device comprising:
the power supply control unit according to claim 13;
a switching element; and
a transformer.

18. The power supply control unit according to claim 14, wherein the predetermined ratio is 20% to 80%.

19. The power supply control unit according to claim 14, wherein the minimum OFF time setting unit is an AND circuit.

20. The power supply control unit according to claim 18, wherein the predetermined ratio is 50%.

21. A power supply control unit used for an isolation type flyback switching power supply device including a transformer having a primary winding and a secondary winding, and a switching element, one terminal of the primary winding being connected to an application terminal of an input voltage, while the other terminal of the primary winding being connected to the switching element, the power supply control unit comprising:

a feedback signal output unit arranged to generate and output a feedback signal of flyback voltage;
an on trigger signal generating unit arranged to generate an on trigger signal for turning on the switching element on the basis of output of the feedback signal output unit;
a first timer arranged to measure a predetermined minimum OFF time;
a second timer arranged to measure time that is a first predetermined ratio of the ON time;
a minimum OFF time setting unit arranged to compare the predetermined minimum OFF time measured by the first timer with the time measured by the second timer so as to set a longer time as a minimum OFF time;
an on timing determining unit arranged to determine timing for turning on the switching element on the basis of the set minimum OFF time and the on trigger signal; and
a timing control unit arranged to control output timing of the feedback signal output unit, wherein
after the switching element is turned off, the timing control unit compares time that is a second predetermined ratio of the predetermined minimum OFF time with time that is a third predetermined ratio of the first predetermined ratio of the ON time, so as to control to output the feedback signal until timing when a longer time elapses, and to hold the output at the timing.

22. The power supply control unit according to claim 21, wherein the second predetermined ratio and the third predetermined ratio are less than 100%.

23. The power supply control unit according to claim 21, wherein the first predetermined ratio is 20% to 80%.

24. The power supply control unit according to claim 21, wherein the timing control unit includes
a third timer arranged to measure time that is a second predetermined ratio of the predetermined minimum OFF time,
a fourth timer arranged to measure time that is a third predetermined ratio of a first predetermined ratio of the ON time,
an AND circuit to which outputs of the third timer and the fourth timer are input, and
a latch circuit to which output of the AND circuit is input.

25. The power supply control unit according to claim 21, wherein the timing control unit controls to start output of the feedback signal at timing when a predetermined mask period elapses after the switching element is turned off.

26. An isolation type switching power supply device comprising:
the power supply control unit according to claim 21;
a switching element; and
a transformer.

27. The power supply control unit according to claim 23, wherein the first predetermined ratio is 50%.

28. The power supply control unit according to claim 24, wherein the third timer and the fourth timer are reset by a PWM signal corresponding to PWM drive of the switching element.

29. The power supply control unit according to claim 28, wherein the timing control unit includes an inverter arranged to receive the PWM signal and to output an output signal to the AND circuit.

30. An isolation type switching power supply device comprising:
a transformer including a primary winding having one terminal to which an application terminal of the input voltage is connected and a secondary winding;

a main switching element having a current input terminal connected to the other terminal of the primary winding;

a sub-switching element having a current input terminal connected to the current input terminal of the main switching element; and a voltage applying unit arranged to apply voltage to a control terminal of the sub-switching element so as to sequentially switch among state where the main switching element and the sub-switching element are both turned on, state where the main switching element is turned off while the sub-switching element is turned on, and state where the main switching element and the sub-switching element are both turned off.

31. The isolation type switching power supply device arranged to claim 30, wherein the voltage applying unit is a comparator, one of input terminals of the comparator is connected to a control terminal of the main switching element, the other input terminal of the comparator is applied with a threshold value voltage as a reference voltage, and an output terminal of the comparator is connected to the control terminal of the sub-switching element.

32. The isolation type switching power supply device arranged to claim 30, wherein the voltage applying unit is a filter arranged to delay voltage to be applied to the control terminal of the main switching element and to apply the delayed voltage to the control terminal of the sub-switching element.

33. The isolation type switching power supply device arranged to claim 30, wherein the current input terminal of the sub-switching element is connected to the current input terminal of the main switching element via a resistance element.

34. The isolation type switching power supply device arranged to claim 30, wherein the main switching element and the sub-switching element are manufactured by the same process.

35. The isolation type switching power supply device arranged to claim 30, wherein the main switching element has a larger size than the sub-switching element.

36. The isolation type switching power supply device arranged to claim 31, wherein the threshold value voltage is set to a value lower than mirror voltage of the main switching element.

37. The isolation type switching power supply device arranged to claim 36, wherein the threshold value voltage is set to a value between the mirror voltage and threshold value voltage of the main switching element itself.

* * * * *